US012243467B2

(12) United States Patent
Wang

(10) Patent No.: US 12,243,467 B2
(45) Date of Patent: Mar. 4, 2025

(54) IMAGE SIGNAL ADJUSTMENT METHOD OF DETECTION DEVICE

(71) Applicant: InnoCare Optoelectronics Corporation, Tainan (TW)

(72) Inventor: Jing-Yao Wang, Tainan (TW)

(73) Assignee: InnoCare Optoelectronics Corporation, Tainan (TW)

( * ) Notice: Subject to any disclaimer, the term of this patent is extended or adjusted under 35 U.S.C. 154(b) by 47 days.

(21) Appl. No.: 18/336,955

(22) Filed: Jun. 16, 2023

(65) Prior Publication Data

US 2024/0038127 A1 Feb. 1, 2024

(30) Foreign Application Priority Data

Jul. 27, 2022 (TW) ................................ 111128072

(51) Int. Cl.
*G09G 3/20* (2006.01)

(52) U.S. Cl.
CPC ... *G09G 3/2074* (2013.01); *G09G 2320/0693* (2013.01); *G09G 2360/16* (2013.01)

(58) Field of Classification Search
CPC ......... G09G 3/2074; G09G 2320/0693; G09G 2360/16; G09G 2320/0285; G09G 3/006
See application file for complete search history.

(56) References Cited

U.S. PATENT DOCUMENTS

2017/0032730 A1* 2/2017 Yeon .................... G09G 3/3607
2021/0295756 A1* 9/2021 Hou ..................... G09G 3/2011

FOREIGN PATENT DOCUMENTS

| | | | | | |
|---|---|---|---|---|---|
| CN | 100369086 C | * | 2/2008 | | G09G 3/288 |
| CN | 101683269 | | 3/2012 | | |
| CN | 104376827 A | * | 2/2015 | | G09G 3/3648 |
| CN | 106842752 A | * | 6/2017 | | G09G 3/3607 |
| CN | 105324808 B | * | 2/2018 | | G09G 3/003 |
| CN | 110047439 A | * | 7/2019 | | G09G 3/3258 |
| CN | 110288556 A | * | 9/2019 | | G06T 5/007 |
| CN | 110491335 A | * | 11/2019 | | G09G 3/32 |
| CN | 111223440 A | * | 6/2020 | | G09G 3/20 |
| CN | 113763857 A | * | 12/2021 | | |
| JP | 2008299040 A | * | 12/2008 | | |
| WO | WO-2019091193 A1 | * | 5/2019 | | G09G 3/20 |

OTHER PUBLICATIONS

Wen-Nung Lie, "Chapter 3 : Image Enhancement in the Spatial Domain", lecture notes from National Chung Cheng University, retrieved Mar. 22, 2023, pp. 1-31.
Guo-Shiang Lin et al., "A Computing Framework of Adaptive Support-Window Multi-Lateral Filter for Image and Depth Processing", IEEE Transactions on Broadcasting, Sep. 2014, pp. 452-463, vol. 60, No. 3.
W.-N. Lie et al., "2D to 3D video conversion with key-frame depth propagation and trilateral filtering", Electronics Letters, Mar. 3, 2011, pp. 1, vol. 47, No. 5.

* cited by examiner

*Primary Examiner* — Ricardo Osorio
(74) *Attorney, Agent, or Firm* — JCIPRNET

(57) ABSTRACT

An image signal adjustment method of a detection device is provided. The detection device outputs an image signal including multiple subpixels. The image signal adjustment method includes the following steps: locating a subpixel to be adjusted; analyzing gray-scale values of subpixels in a first direction passing through the subpixel to be adjusted; and using the gray-scale values of the subpixels in the first direction to calculate a gray-scale value of the subpixel to be adjusted.

19 Claims, 6 Drawing Sheets

IMAGE SIGNAL ADJUSTMENT METHOD OF DETECTION DEVICE

CROSS-REFERENCE TO RELATED APPLICATION

This application claims the priority benefit of Taiwan application serial no. 111128072, filed on Jul. 27, 2022. The entirety of the above-mentioned patent application is hereby incorporated by reference herein and made a part of this specification.

BACKGROUND

Technical Field

The disclosure relates to an image adjustment, and in particular relates to an image signal adjustment method of a detection device.

Description of Related Art

During image generation, it is often encountered that the generated image has defects, such as defect points or defect lines. Nowadays, image adjustment is performed by means of extrapolation by comparing the surrounding spectrum through Fourier transform. However, the image adjustment method using the extrapolation method requires high computing power in the computing device, and the computing time for image adjustment is quite long. Therefore, for the practical application environment, there are limitations to the computing device and the inconvenience of being time-consuming, so that a highly compatible and high-performance image computing method may not be provided.

SUMMARY

The disclosure is directed to an image signal adjustment method of a detection device, which may improve image defects and/or shorten the operation time of an image adjustment function.

According to an embodiment of the disclosure, an image signal adjustment method of a detection device of the disclosure is provided. The detection device may output an image signal including a multiple subpixels. The image signal adjustment method includes the following steps. A subpixel to be adjusted is located. Gray-scale values of subpixels in a first direction passing through the subpixel to be adjusted are analyzed. The gray-scale values of the subpixels in the first direction are used to calculate a gray-scale value of the subpixel to be adjusted.

Based on the above, the image signal adjustment method of the detection device of the disclosure may improve the defect points in the image, and may realize the image adjustment function with low power consumption and/or shortened operation time.

In order to make the aforementioned features and advantages of the disclosure comprehensible, embodiments accompanied with drawings are described in detail below.

DETAILED DESCRIPTION OF DISCLOSED EMBODIMENTS

Figure 1:
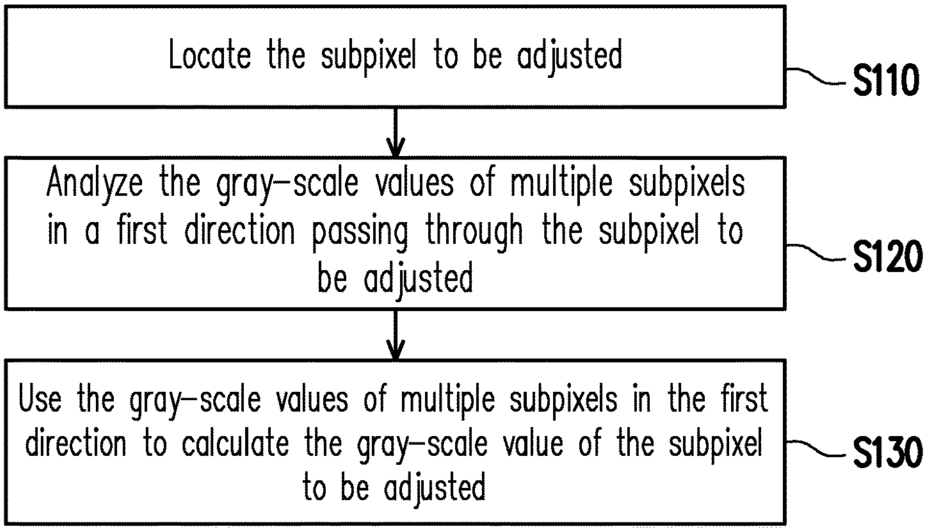
FIG. 1 is a flowchart of an image signal adjustment method according to an embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

Certain terms may be used throughout the disclosure and the appended patent claims to refer to specific elements. It should be understood by those skilled in the art that electronic device manufacturers may refer to the same components by different names. The disclosure does not intend to distinguish between components that have the same function but have different names. In the following description and patent claims, words such as "comprising" and "including" are open-ended words, so they should be interpreted as meaning "including but not limited to . . . ".

In the disclosure, wordings used to indicate directions, such as "up," "down," "front," "back," "left," and "right," merely refer to directions in the accompanying drawings. Therefore, the directional wordings are used to illustrate rather than limit the disclosure. In the accompanying drawings, the drawings illustrate the general features of the methods, structures, and/or materials used in the particular embodiments. However, the drawings shall not be interpreted as defining or limiting the scope or nature covered by the embodiments. For example, the relative sizes, thicknesses, and locations of the layers, regions, and/or structures may be reduced or enlarged for clarity.

In some embodiments of the disclosure, terms related to joining and connecting, such as "connected", "interconnected", etc., unless otherwise defined, may mean that two structures are in direct contact, or may also mean that two structures are not in direct contact, in which there are other structures located between these two structures. The terms related to joining and connecting can also include the case where both structures are movable, or both structures are fixed. Furthermore, the term "coupled" includes any direct or indirect means of electrical connection. In the case of a direct electrical connection, the end points of two elements on a circuit directly connect to each other, or connect to each other through a conductive wire. In the case of indirect electrical connection, a switch, a diode, a capacitor, an inductor, a resistor, other suitable elements, or a combination thereof, but not limited therein, is between the end points of two elements on a circuit.

The terms "about", "equal to", "equal" or "same", "substantially" or "generally" are interpreted as within 20% of a given value or range, or interpreted as within 10%, 5%, 3%, 2%, 1%, or 0.5% of the given value or range.

In the disclosure, the thickness, length, and width may be measured by adopting a measurement method such as an optical microscope (OM), and the thickness or width can be measured from a cross-sectional image in an electronic microscope, but not limited thereto. In addition, any two values or directions used for comparison may have certain errors. Furthermore, the terms "a given range is from a first value to a second value", "a given range is within a range from the first value to the second value" means that the given range includes the first value, the second value, and other values in between. If a first direction is perpendicular to a second direction, an angle between the first direction and the second direction may be between 80 degrees and 100 degrees; if the first direction is parallel to the second direction, an angle between the first direction and the second direction may be between 0 degrees and 10 degrees.

The terms such as "first", "second", etc. used in the description and the patent claims are used to modify elements, which do not imply and represent that the, or these, components have any previous ordinal numbers, and also does not represent the order of a certain element and another element, or the order of the manufacturing method. The use of these ordinal numbers is to only clearly distinguish an element with a certain name from another element with the same name. The same terms may not be used in the patent claims and the description, and accordingly, the first component in the description may be the second component in the patent claims. It should be noted that, in the following embodiments, the technical features in several different embodiments can be replaced, reorganized, and mixed to complete other embodiments without departing from the spirit of the disclosure.

It should be noted that, in the following embodiments, the features in several different embodiments can be replaced, reorganized, and mixed to complete other embodiments without departing from the spirit of the disclosure. As long as the features of the various embodiments do not violate the spirit of the disclosure or conflict with one another, they can be mixed and matched arbitrarily.

Unless otherwise defined, all terms (including technical and scientific terms) used herein have the same meaning as commonly understood by one of ordinary skill in the art to which this disclosure belongs. It is understood that these terms, such as those defined in commonly used dictionaries, should be interpreted as having meanings consistent with the relevant art and the background or context of the disclosure, and should not be interpreted in an idealized or overly formal manner, unless otherwise defined in the embodiments of the disclosure.

In the disclosure, a detection device may be a device for detecting light, image, 2D image, 3D image, gray-scale image, but not limited thereto. In the disclosure, a detection device may include electronic elements, and the electronic elements may include passive elements and active elements, such as a capacitor, a resistor, an inductor, a diode, a transistor, and the like. The diode may include a light emitting diode or a photodiode. The light emitting diode may include, for example, an organic light emitting diode (OLED), a mini light emitting diode (mini LED), a micro light emitting diode (micro LED), or a quantum dot light emitting diode (quantum dot LED), but not limited thereto. In the disclosure, the detection device may be an X-ray device, and may be used to obtain detection images (e.g., X-ray images). The X-ray device includes an image detection module, a processor, and a memory. The image detection module may include a detector array, in which the detector array includes multiple detectors that may be used to detect X-rays or visible light. When the image detection module performs detection, the detection target may be disposed between the X-ray light source and the image detection module. The X-ray light source may illuminate the detection target, and the image detection module generates detection signals and provides the detection signals to the processor.

In another embodiment, the detection device may be, for example, an electronic device including a processor and a memory, such as a personal computer (PC), a laptop, a tablet, or a smart phone and such equipment, and may output according to user control or automatically output control signals to image detection devices (e.g., X-ray devices). The processor may receive the image signal transmitted by the detection device, and the processor may be a field programmable gate array (FPGA) or a graphics processing unit (GPU), or other suitable elements. Also, the processor may be used to execute the modules stored in the memory. The memory may be a dynamic random access memory (DRAM). Hereinafter, the detection device is used as the electronic device for outputting the image signal to illustrate the disclosure, but the disclosure is not limited thereto.

FIG. 1 is a flowchart of an image signal adjustment method according to an embodiment of the disclosure. In this embodiment, the detection device may communicate with other electronic devices or other electronic units through wireless signals (such as bluetooth or wifi, but the disclosure is not limited thereto) or wired connection, so as to obtain image signals including multiple subpixels and gray-scale values. In another embodiment, the detection device may generate an image signal, and convert the image signal into an image signal including a gray-scale value of each of the pixels. The detection device may convert the brightness information of each of the subpixels of the received image signal into gray-scale value information through a perceptual quantized optical-electrical conversion function, or convert the image signal into gray-scale value through an image capture technology, the disclosure is not limited thereto. Referring to FIG. 1, after the detection device outputs an image signal including multiple subpixels, the processor may execute steps S110 to S130 shown in FIG. 1. In step S110, the processor may locate the subpixel to be adjusted in the image signal. Specifically, the processor may check each of the subpixels on the image signal one by one in a left-to-right and top-to-bottom manner, and then find the defect position (subpixel to be adjusted), but the disclosure is not limited thereto.

In step S120, the processor may analyze the gray-scale values of the subpixels in a first direction passing through the subpixel to be adjusted. Specifically, the processor may calculate the change of the gray-scale value of the adjacent subpixels of the subpixel to be adjusted, and obtain the subpixels whose difference of gray-scale value between adjacent subpixels is smaller than a threshold value among the multiple subpixels on the same line. The straight line is a virtual straight line passing through the subpixel to be adjusted, or called a vector. In this embodiment, the processor may use a direction in which the difference between the gray-scale values of adjacent subpixels among the subpixels on the same line as the subpixel to be adjusted is smaller than a threshold value as the first direction. Next, the processor may analyze the gray-scale values of multiple subpixels in the first direction passing through the subpixel to be adjusted in the image signal.

In step S130, the processor may use the gray-scale values of multiple subpixels in the first direction to calculate the gray-scale value of the subpixel to be adjusted. Specifically, the processor may use the gray-scale values of multiple subpixels in the first direction (i.e., the direction in which the difference between the gray-scale values of adjacent subpixels is smaller than the threshold value) as the reference value of the subpixel to be adjusted, to calculate the gray-scale value of the subpixel to be adjusted. In one embodiment, the processor may obtain the left subpixel and the right subpixel located in the first direction and adjacent to the subpixel to be adjusted. Moreover, the processor may take the average value of the gray-scale values of the left subpixel and the right subpixel as the gray-scale value of the subpixel to be adjusted.

Figure 2A:
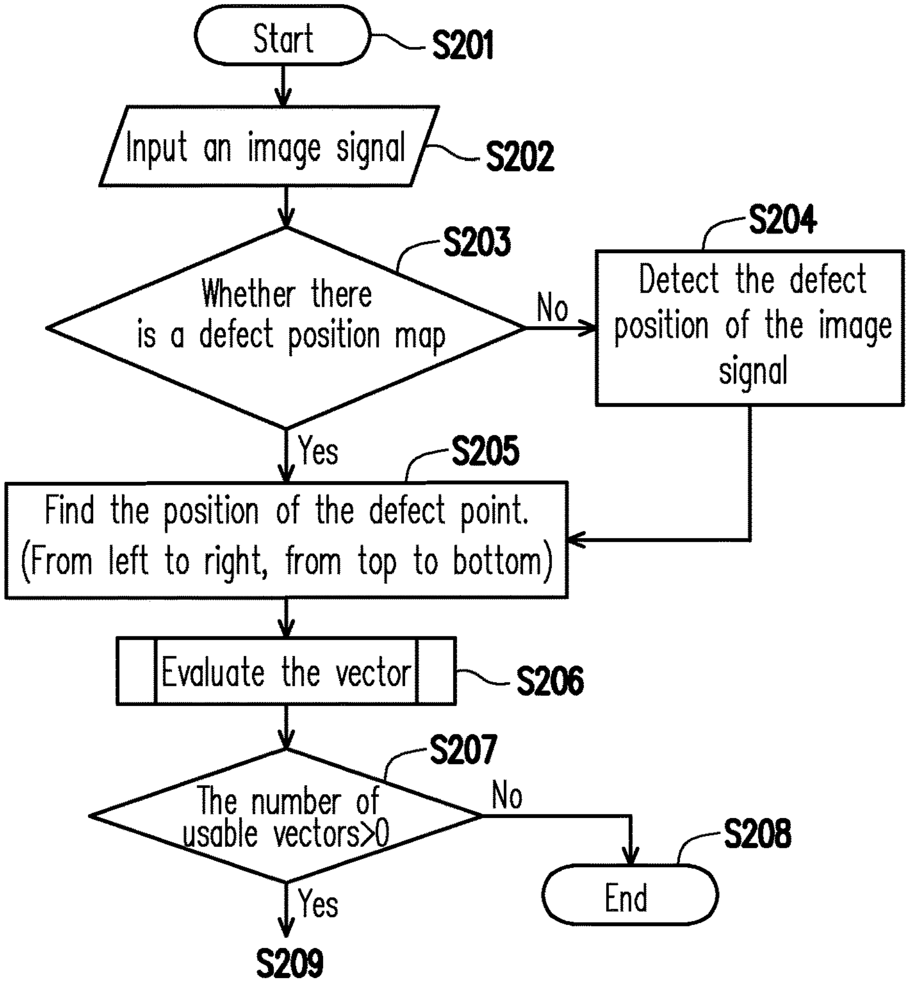
FIG. 2A and FIG. 2B are flowcharts of an image signal adjustment method according to an embodiment of the disclosure.
Figure 2B:
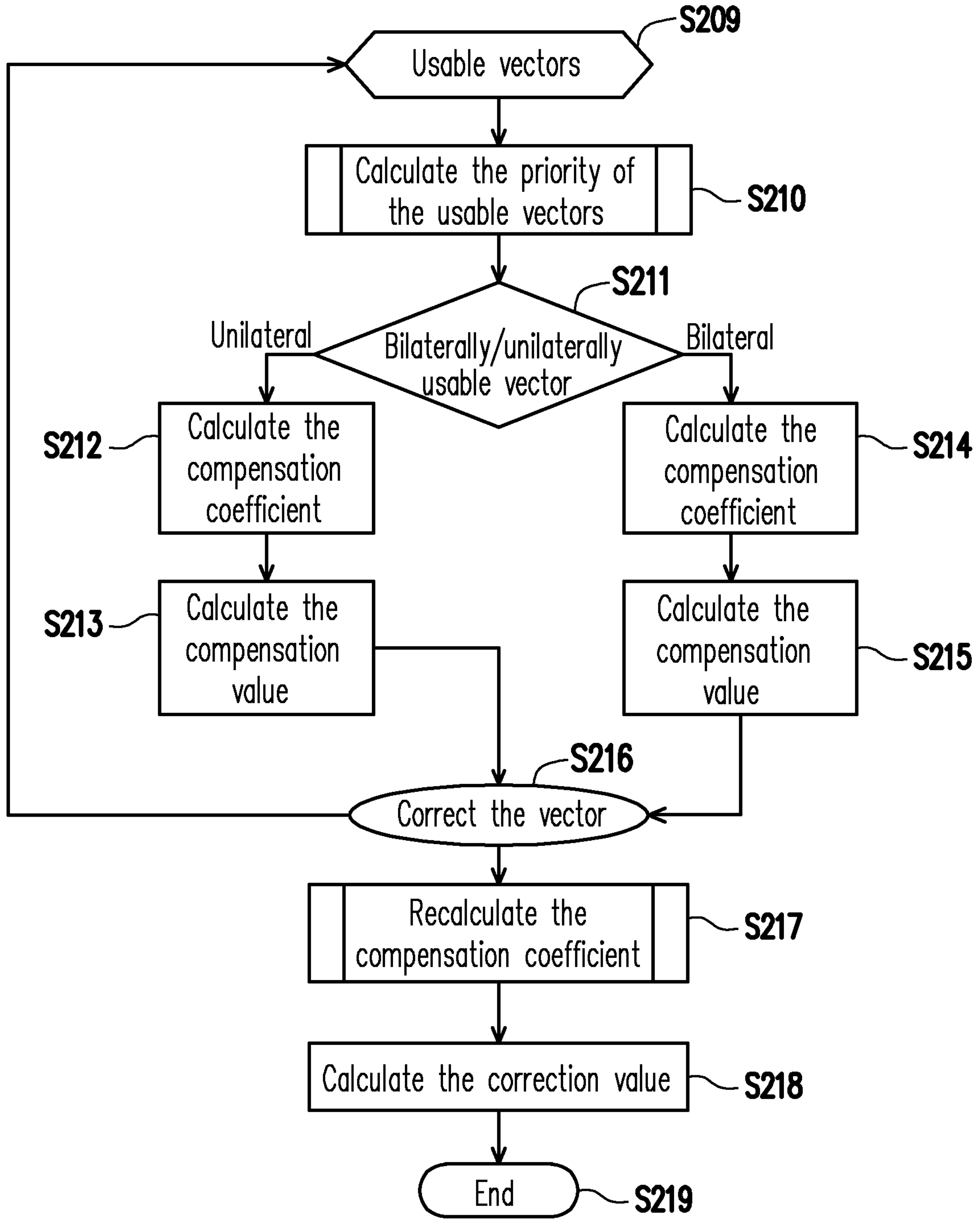

FIG. 2A and FIG. 2B are flowcharts of an image signal adjustment method according to an embodiment of the disclosure. Referring to FIG. 2A and FIG. 2B, after the measuring device inputs the image signal to be adjusted to the processor, the processor may execute the following steps S201 to S219. In step S201, the processor may start to execute the image signal adjustment process. In step S202, the processor may input an image signal. The processor receives the command to execute the adjustment of the image signal and the image signal input by the measuring device. In step S203, the processor may determine whether there is a defect position map in the image signal. If the image does not contain the defect position map, step S204 is executed. In step S204, the processor may, for example, use an image comparison method to detect the defect position of the image signal, but the disclosure is not limited thereto, and then step S205 is executed.

After step S203 is executed, if the image contains a defect position map, then step S205 is executed. In step S205, the processor may find the position of the defect point. From left to right and from top to bottom at each of the defect point position in the image signal, the positions of the defect points to be adjusted and its subpixels are found one by one in the image signal adjustment process. Next, in step S206, the processor may evaluate the vector. In step S207, the processor may determine whether the number of usable vectors is greater than 0. If the number of usable vectors is not greater than 0, step S208 is executed to end the current image signal adjustment process. If the number of usable vectors is greater than 0, step S209 is executed. In step S209, the processor may execute step S210 on at least one or more of the usable vectors one by one. In step S210, the processor may calculate the priority of the usable vectors.

In step S211, the processor may determine that the usable vector is a bilaterally usable vector or a unilaterally usable vector. If the usable vector is a unilaterally usable vector, then step S212 and step S213 are executed. If the usable vector is a bilateral usable vector, then step S214 and step S215 are executed. In this regard, with the subpixel to be adjusted as the center, it is a bilateral usable vector if both sides of the usable vector are usable vectors. With the subpixel to be adjusted as the center, it is a unilaterally usable vector if only one side is usable.

In step S212 and step S214, the processor may calculate the compensation coefficient. Specifically, the compensation coefficient of the bilaterally usable vector may be calculated according to the following Formula 1. In Formula 1, $I_l$ is the gray-scale value of the first usable subpixel on the left side of the subpixel to be adjusted as the center. $I_r$ is the gray-scale value of the first usable subpixel on the right side of the subpixel to be adjusted. And, the compensation coefficient of the unilaterally usable vector may be calculated according to the following Formula 2. In Formula 2, $I_{outer}$ is the gray-scale value of the usable subpixel near the outer side of the subpixel to be adjusted as the center. $I_{inner}$ is the gray-scale value of usable subpixel near the inner side of the subpixel to be adjusted.

$$1/(|I_l-I_r|+1) \quad \text{Formula 1}$$

$$1/(|I_{outer}-I_{inner}|+1) \quad \text{Formula 2}$$

Figure 3A:
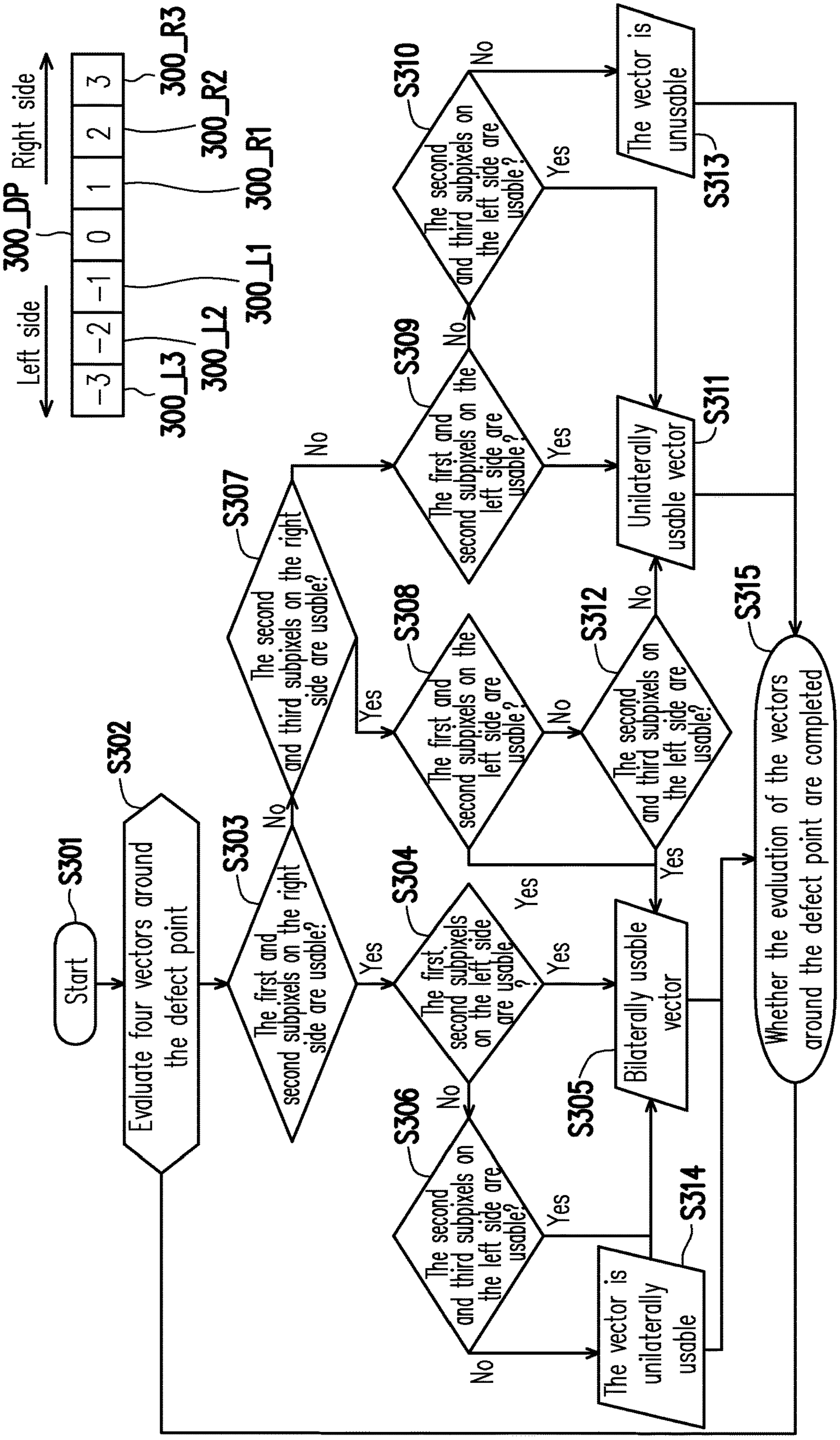
FIG. 3A is a flowchart of an evaluation vector according to an embodiment of the disclosure.

In step S213 and step S215, the processor may calculate the compensation value. Specifically, the compensation value of the bilaterally usable vector may be calculated according to the following Formula 3. In Formula 3, $P_r$ is the position of the first usable subpixel on the right side of the subpixel to be adjusted as the center. $P_l$ is the position of the first usable subpixel on the left side of the subpixel to be adjusted as the center. FIG. 3A is a flowchart of an evaluation vector according to an embodiment of the disclosure. Referring first to the upper right corner of FIG. 3A, when the first usable subpixel on the left side is the first subpixel on the left side of the subpixel to be adjusted, the value of $P_l$ is −1. When the first usable subpixel on the right side is the second subpixel on the right side of the subpixel to be adjusted, the value of $P_r$ is 2. The compensation value of the one-sided usable vector may be calculated according to the following Formula 4. Therefore, it may be seen that the image signal adjustment method of the disclosure may use the interpolation method onto the gray-scale values of multiple subpixels in at least one direction to obtain the compensation value and compensation coefficient (weight value) of the vector in each direction. In addition, the gray-scale value (correction value) of the subpixel to be adjusted is calculated according to the compensation value and compensation coefficient of each of the vectors.

$$(I_l \times P_r^2 + I_r \times P_l^2)/(P_l^2 + P_r^2) \quad \text{Equation 3}$$

$$2I_{inner}-I_{outer} \quad \text{Formula 4}$$

It should be noted that the usable subpixels near the inner side and the usable subpixels near the outer side are adjacent usable subpixels. Referring to FIG. 3A, when the unilaterally usable vector is the right-side usable vector, and the usable subpixels are the first subpixel and the second subpixel, the usable subpixel near the inner side is the first subpixel 300_R1 on the right side, and the usable subpixel near the outer side is the second subpixel 330_R2 on the right side.

In step S216, the processor may correct the vector to execute step S217 according to the compensation coefficient and compensation value of each of the usable vectors. In step S217, the processor may recalculate the compensation coefficient for each of the usable vectors. In step S218, the processor may calculate the correction value of the subpixel to be adjusted, and then step S219 is executed to end the process of adjusting the image signal.

Figure 3B:
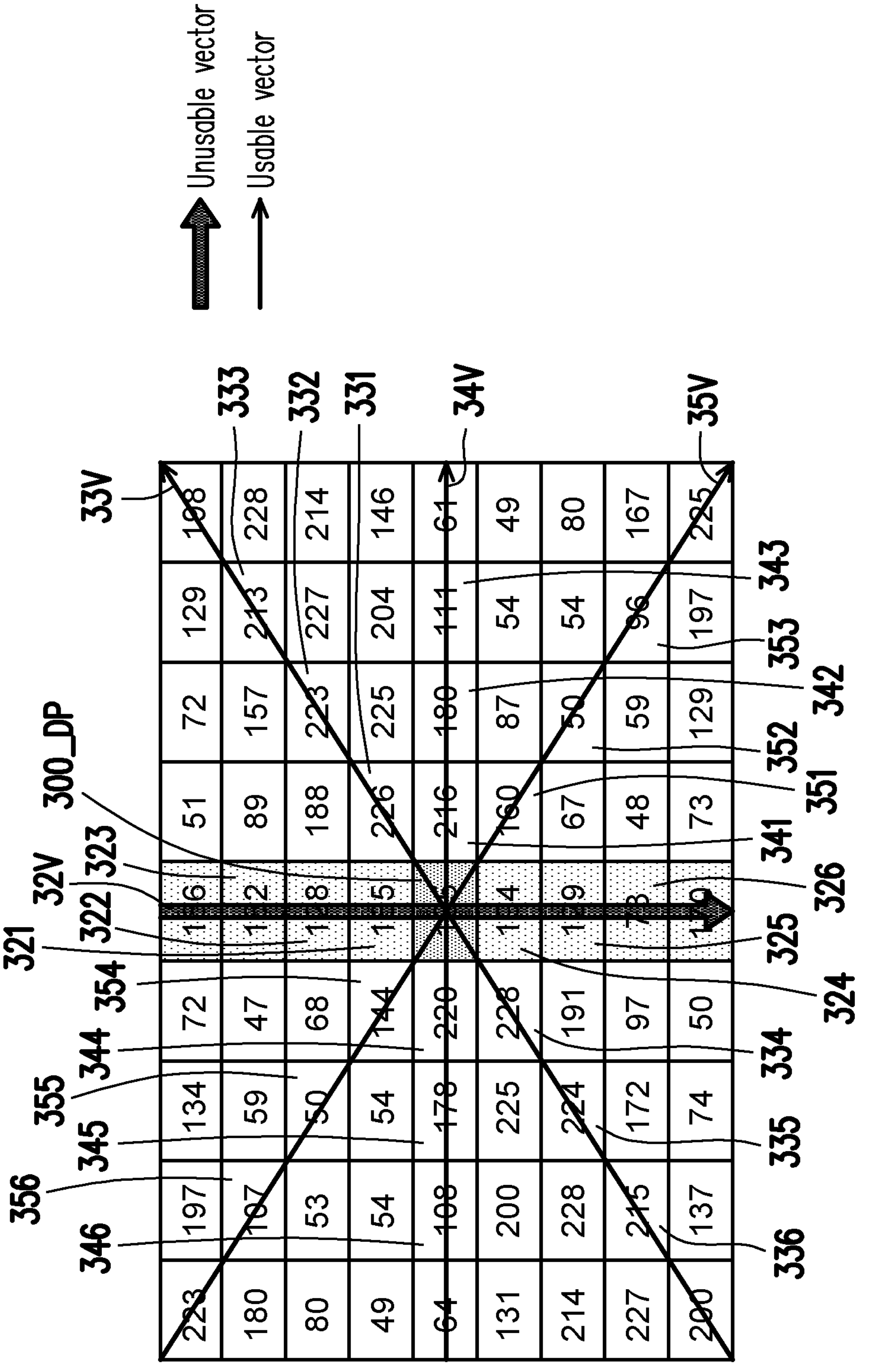
FIG. 3B is a schematic diagram of pixel values according to an embodiment of the disclosure.

FIG. 3B is a schematic diagram of pixel values according to an embodiment of the disclosure. Referring to FIG. 2A, FIG. 3A, and FIG. 3B, FIG. 3A is a detailed implementation flowchart of step S206 of FIG. 2A. After the processor obtains a subpixel to be adjusted 300_DP, the processor may perform the following steps S301 to S315. In step S301, after receiving the image signal including the subpixel to be adjusted 300_DP, the processor starts to evaluate the vector. In step S302, the processor may evaluate four vectors around the defect point (subpixel to be adjusted 300_DP). As shown in FIG. 3B, with the subpixel to be adjusted 300_DP as the center, four vectors passing through the subpixel to be adjusted 300_DP may be obtained respectively. In this embodiment, the four vectors are a vertical vector 32V, a positive oblique vector 33V, a horizontal vector 34V, and a negative oblique vector 35V. Specifically, the processor performs the determining process of bilateral/unilateral/unusable vectors for the four vectors one by one (steps S303 to S313).

In step S303, the processor may determine whether the first and second subpixels on the right side of the subpixel to be adjusted 300_DP are usable. If yes, the processor executes step S304. If not, the processor executes step S307. Specifically, as shown in FIG. 3A, the first subpixel on the right side of the subpixel to be adjusted 300_DP is the first subpixel 300_R1 on the right side adjacent to the subpixel to be adjusted 300_DP, the second subpixel on the right side is 300_R2, the third subpixel on the right side is 300_R3, the first subpixel on the left side is 300_L1, the second subpixel on the left side is 300_L2, and so on. Whether each of the subpixels in the image signal is usable is determined according to whether it is a non-defective point or not. It should be noted that when determining whether a vector is usable, it is determined according to whether two adjacent subpixels on the same side are usable subpixels. In one embodiment, the two adjacent subpixels on the same side may be the first subpixel on the right side and the second subpixel on the right side. In another embodiment, the two adjacent subpixels on the same side may be the second subpixel on the left side and the third subpixel on the left side, but the disclosure is not limited thereto.

In step S304, the processor may determine whether the first and second subpixels on the left side are usable. If yes, the processor executes step S305. If not, the processor executes step S306. In step S305, the processor may determine that the vector is bilaterally usable. Referring to FIG. 3B, after step S303 is executed, since a first subpixel 331 on the right side and a second subpixel 332 on the right side on the vector 33V are non-defective points, they are usable subpixels. Next, the processor may execute step S304 to determine that a first subpixel 334 on the left side and a second subpixel 335 on the left side on the vector 33V are non-defective points, and are determined as usable subpixels. Furthermore, the processor may execute step S305 to further determine that the vector 33V is a bilaterally usable vector.

In step S306, the processor may determine whether the second and third subpixels on the left side are usable. If yes, the processor executes step S305. If not, the processor executes step S314. In step S307, the processor may determine whether the second and third subpixels on the right side are usable. If yes, the processor executes step S308. If not, the processor executes step S309. In step S308, the processor may determine whether the first and second subpixels on the left side are usable. If yes, the processor executes step S305. If not, the processor executes step S312. In step S309, the processor may determine whether the first and second subpixels on the left side are usable. If yes, the processor executes step S311. If not, the processor executes step S310. In step S310, the processor may determine whether the second and third subpixels on the left side are usable. If yes, the processor executes step S311. If not, the processor executes step S313.

In step S311 and step S314, the processor may determine that the vector is unilaterally usable. In step S312, the processor may determine whether the second and third subpixels on the left side are usable. If yes, the processor executes step S305. If not, the processor executes step S311. In step S313, the processor may determine that the vector is unusable. Referring to FIG. 3B, since a first subpixel 324 on the right side and a second subpixel 325 on the right side on the vector 32V are defective points, they are unusable subpixels. Next, the processor may execute step S307 to determine that the second subpixel 325 on the right side and a third subpixel 326 on the right side on the vector 32V are still defective points and therefore are unusable subpixels.

As mentioned above, the processor may then execute step S309 on the vector 32V. The processor may determine that a first subpixel 321 on the left side and a second subpixel 332 on the left side on the vector 32V are also defective points, and therefore are unusable subpixels. Next, the processor may execute step S310 to determine that the second subpixel 332 on the left side and a third subpixel 333 on the left side on the vector 32V are still defective points and therefore are unusable subpixels. After the determination result in step S310 is "No", the processor may execute step S313 to further determine that the vector 32V is an unusable vector. In addition, the processor may execute step S315. In step S315, the processor may determine whether the evaluation of the vectors around the defect point are completed. Specifically, the processor may determine whether all four vectors around the subpixel to be adjusted 300_DP (i.e., the defect point) have completed the evaluation. Referring to FIG. 3B, after the evaluation process of the four vectors one by one (step S303 to step S314), the processor may recognize that the vector 32V is an unusable vector, and may recognize that the vector 33V, the vector 34V, and the vector 35V are bilaterally usable vectors.

Figure 4:
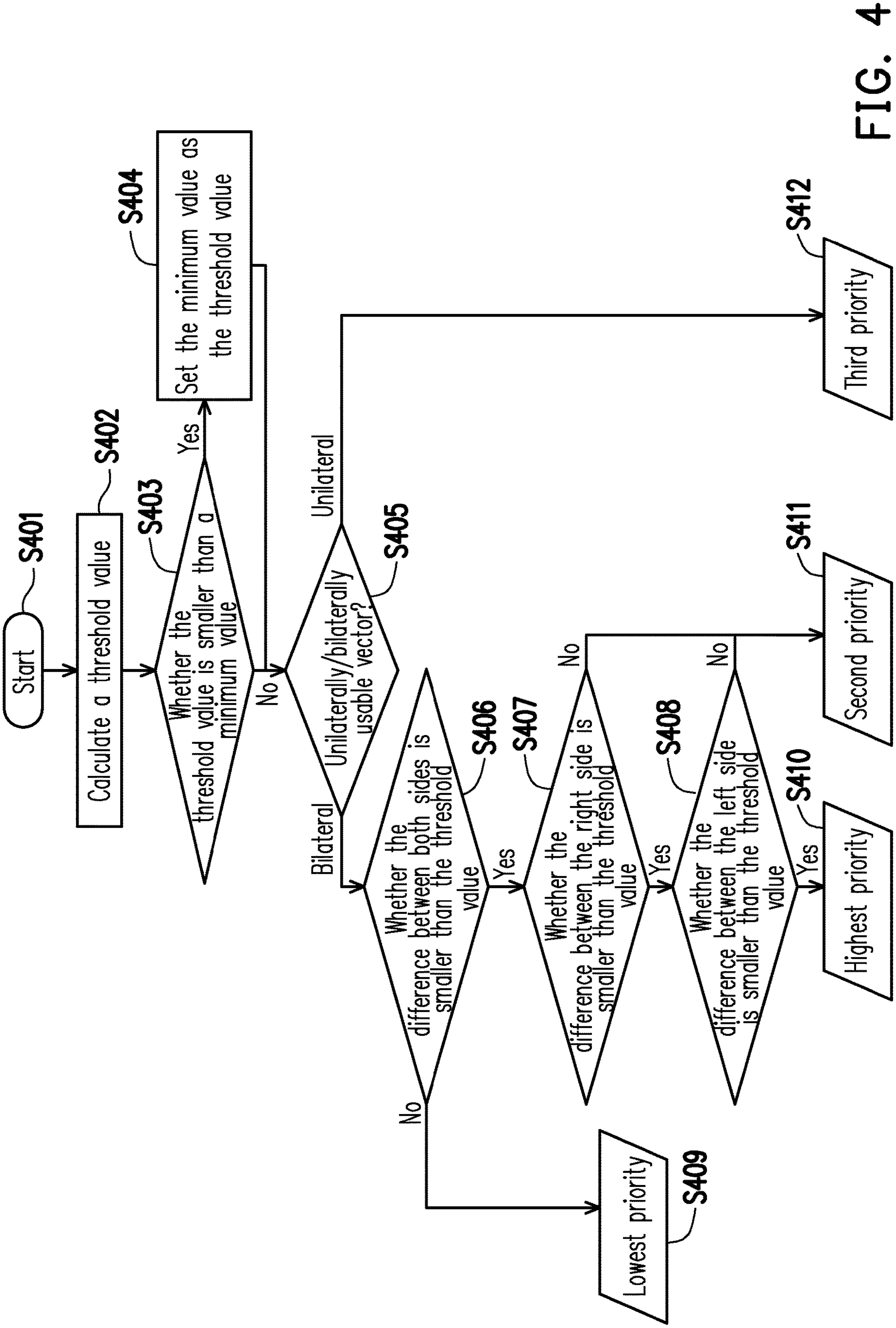
FIG. 4 is a flowchart of calculating a priority according to an embodiment of the disclosure.

FIG. 4 is a flowchart of calculating a priority according to an embodiment of the disclosure. Referring to FIG. 2B and FIG. 4, FIG. 4 is a detailed implementation flowchart of step S210 in FIG. 2B. After the processor obtains the usable vector, the processor may perform the following steps S401 to S412. In step S401, the processor may start to calculate the vector priority. In step S402, the processor may calculate a threshold value. In this embodiment, the processor may determine the threshold value according to the gray-scale values of the subpixels around the subpixel to be adjusted. That is, the processor may calculate the threshold value according to the difference between adjacent multiple usable subpixels. Specifically, the processor may calculate the threshold value according to the absolute value of the difference between the first subpixel on the left side and the first subpixel on the right side of the bilaterally usable vector and the absolute value of the difference between the first subpixel on the same side (usable side) and the second subpixel on the same side of the unilaterally usable vector. The processor may take the absolute value of the difference into the following equation 5 for calculation. In Formula 5, Diff is the absolute value of the difference. Next, the processor uses the absolute value of the difference closest to 20% as the threshold value, but the disclosure is not limited thereto.

$$\frac{Diff_i}{\Sigma_i \; Diff} \times 100\% \quad \text{Formula 5}$$

Referring to FIG. 3B to describe step S402, the processor may determine that the vector 33V is a bilaterally usable vector, and thus calculates the absolute value of the difference between the gray-scale values according to the first subpixel 331 on the right side and the first subpixel 334 on the left side of the vector 33V. The processor may determine that the absolute value of the difference of the vector 33V, which is 226 minus 228 and taking the absolute value, thus 2 may be obtained. By analogy, the absolute value of the difference of the vector 34V is 4. The absolute value of the difference of the vector 35V is 16. The processor may determine to take the absolute value of each of the differences into Formula 5 above to obtain the difference percentage of each of the usable vectors. The difference percentage of vector 33V is 9%, the difference percentage of vector 34V is 18%, and the difference percentage of vector 35V is 72%.

Next, the processor may determine to use the absolute value of the difference whose difference percentage is closest to 20% as the threshold value. In this embodiment, the threshold value is 4 (the absolute value of the difference of the vector 34V). In another embodiment, the threshold value is a preset value and may be set by the user.

In step S403, the processor may determine whether the threshold value is smaller than a minimum value. Specifically, the minimum value is a preset value, and may be any positive integer according to the setting of the user, such as 4, 5, or 10, but the disclosure is not limited thereto. In step S404, when the processor determines that the threshold value is smaller than the minimum value, the minimum value is set as the threshold value. In this embodiment, the threshold value obtained in step S402 is 4, and the minimum value is set to 5. Therefore, the processor may perform step S404 to take 5 of the minimum value as the threshold value of this embodiment (i.e., the threshold value is adjusted to 5).

In step S405, the processor may determine the priority according to the unilaterally/bilaterally usable vectors. If it is a bilaterally usable vector, the processor executes step S406. If it is a unilaterally usable vector, the processor executes step S412. In step S406, in the bilaterally usable vector, the processor may determine whether the difference between the gray-scale values of the subpixels on both sides of the subpixel to be adjusted is smaller than the threshold value. If yes, the processor executes step S407. If not, the processor executes step S409. In step S407, the processor may determine whether the difference between the gray-scale values of the subpixels on the right side of the subpixel to be adjusted is smaller than the threshold value. If yes, the processor executes step S408. If not, the processor executes step S411. In step S408, the processor may determine whether the difference between the gray-scale values of the left side subpixel of the subpixel to be adjusted is smaller than the threshold value, and if so, step S410 is executed. If not, the processor executes step S411. In step S409, the processor may determine that it belongs to the lowest priority (fourth priority). In step S410, the processor may determine that it belongs to the first priority, which is also the highest priority. Specifically, in step S405, since the vector 33V is a bilaterally usable vector, the processor may then execute step S406.

In step S406, the processor may determine that the difference between the gray-scale values of the subpixels on both sides of the subpixel to be adjusted in the vector 33V is 2 (228 minus 226 and taking the absolute value) and is smaller than the threshold value. In step S407, the processor may determine that the difference between the gray-scale values of the right side subpixels of the subpixel to be adjusted in the vector 33V is 3 (226 minus 223 and taking the absolute value) and is smaller than the threshold value. In step S408, the processor may determine that the difference between the gray-scale values of the left side subpixels of the subpixel to be adjusted in the vector 33V is 4 (228 minus 224 and taking the absolute value). In steps S406 to S408, since the difference between the two sides, the difference between the right side, and the difference between the left side of the vector 33V are all smaller than the threshold value, the processor may execute step S410 to determine that the vector 33V has the highest priority.

In step S411, the processor may determine that it belongs to the second priority. In step S412, since the vector is a unilaterally usable vector, the processor may determine that the vector belongs to the third priority. In this embodiment, the difference between the gray-scale values of the subpixels on both sides of the subpixel to be adjusted in the vector 34V is 4 (216 minus 220 and taking the absolute value), and the difference between the gray-scale values of the right side subpixels of the subpixel to be adjusted in the vector 34V is 36 (216 minus 180 and taking the absolute value). Therefore, the processor may perform step S411 to determine that the vector 34V is the second priority. Since the difference between the gray-scale values of the subpixels on both sides of the subpixel to be adjusted in the vector 35V is 16 (160 minus 144 and taking the absolute value), the processor may execute step S409 to determine that the vector 35V has the lowest priority.

Figure 5:
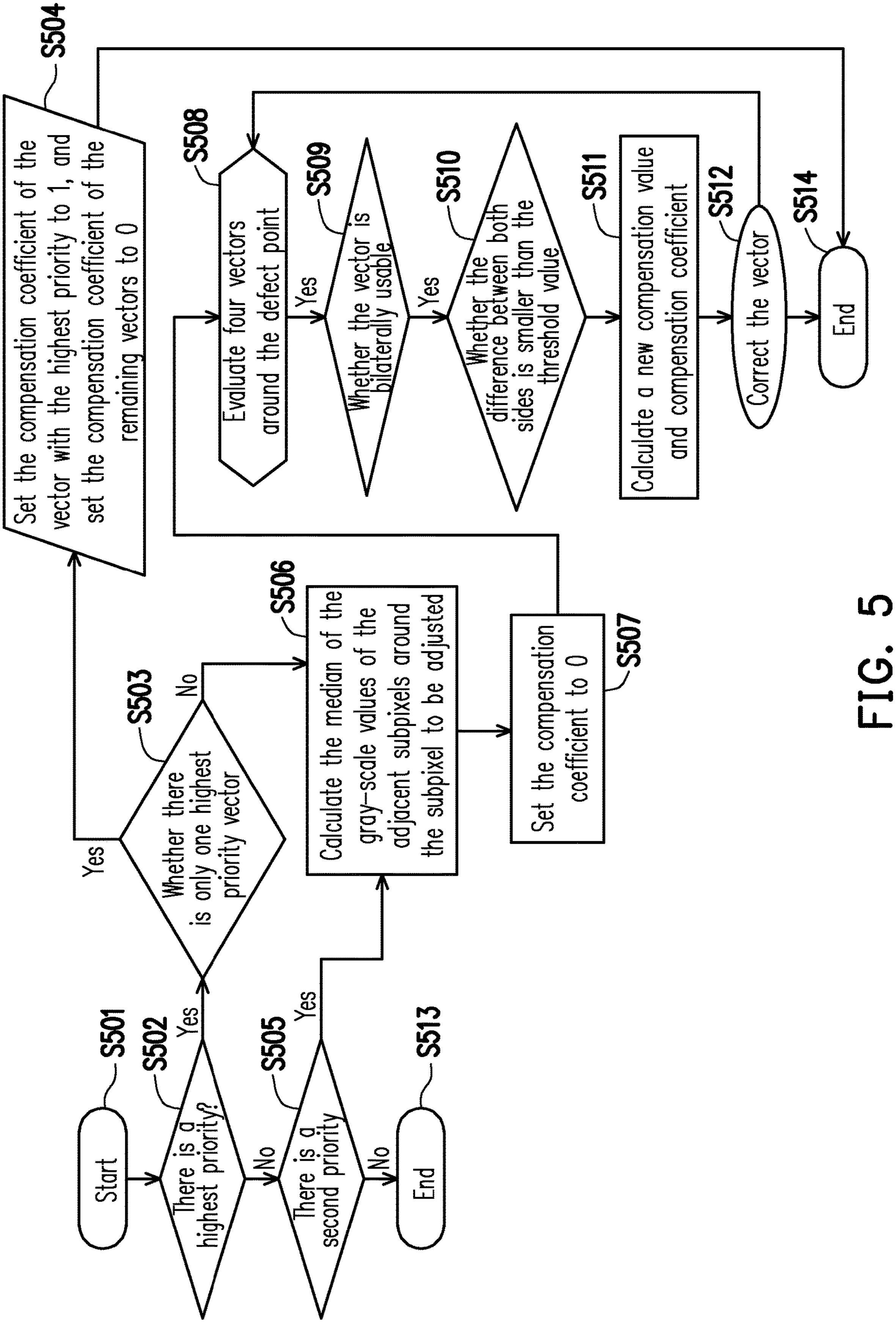
FIG. 5 is a flowchart of recalculating compensation coefficients according to an embodiment of the disclosure.

FIG. 5 is a flowchart of recalculating compensation coefficients according to an embodiment of the disclosure. Referring to FIG. 2B and FIG. 5, FIG. 5 is a detailed implementation flowchart of step S217 of FIG. 2B. After the processor obtains the compensation coefficient and the compensation value of each of the usable vectors, the processor may perform the following steps S501 to S514. In step S501, the processor may start to recalculate the compensation coefficient. In step S502, the processor may determine whether there is a vector with the highest priority. If yes, the processor executes step S503. If not, the processor executes step S505. In step S503, the processor may determine whether there is only one highest priority vector. If so, the processor executes step S504, and the processor then executes step S514 to end the process of recalculating the compensation coefficient. If not, the processor executes step S506. In step S504, the processor may set the compensation coefficient of the vector with the highest priority to 1, and set the compensation coefficient of the remaining vectors to 0. Referring to FIG. 3B, in this embodiment, the processor may determine that the vector with the highest priority is only the vector 33V, so step S504 is executed to set the compensation coefficient of the vector 33V to 1 according to the compensation coefficient, and the compensation coefficients of the other vectors are set to 0. Next, the processor executes step S514 to end the process of recalculating the compensation coefficient.

In step S505, the processor may determine whether there is a second priority. In step S506, the processor may calculate the median of the gray-scale values of the adjacent subpixels around the subpixel to be adjusted. In step S507, the processor may first set all compensation coefficients to 0. In step S508, the processor may evaluate four vectors around the defect point. In step S509, the processor may determine whether the vector is bilaterally usable.

In another embodiment, when there are multiple vectors with the highest priority, after the processor executes the step S503 above, the processor then executes the step S506 to calculate the median of the gray-scale values of the adjacent multiple usable subpixels around the subpixel to be adjusted. In addition, the processor executes steps S507 to S510 to compare the threshold value with the gray-scale values of subpixels in the first direction (the highest priority vector, e.g., vector 33V) and the gray-scale values of subpixels in the second direction (the second priority vector) to determine the respective weight value (compensation coefficient).

Specifically, in step S510, the processor may determine whether the difference between the gray-scale values of the subpixels on both sides is smaller than the threshold value. If the difference between the gray-scale values of the subpixels on both sides is smaller than the threshold value, the processor executes step S511. For example, in the vector 35V shown in FIG. 3B, since the difference between the gray-scale values of the subpixels on both sides is 16 (the gray-scale value of the subpixel 351 minus the gray-scale value of the subpixel 354), the processor may not execute step S511 on the vector 35V (calculate a new compensation value and compensation coefficient), and set the compensation coefficient to zero (step S507). In addition, it may be known from step S510 that the image adjustment method of the disclosure determines the weight value according to the degree of change of the gray-scale values of the subpixels in the same direction.

In this embodiment, the processor may determine the weight value by using the gray-scale values of multiple subpixels around the subpixel to be adjusted. Specifically, in step S511, the processor may calculate a new compensation value and compensation coefficient. The new compensation coefficient may be calculated according to the following Formula 6. In Formula 6, Med(I) is the median of the gray-scale values of adjacent usable subpixels of the subpixel to be adjusted. $I_{Correction}$ is the average gray-scale value of the usable subpixels on both sides of the bilaterally usable vector. β is used to avoid zero denominator terms and may be set to any positive number. k is used to enhance the inverse relationship between the image intensity difference and the compensation coefficient, and may be set to any positive integer. In this embodiment, β may be, for example, 0.01, and k may be, for example, 3, but the disclosure is not limited thereto.

$$\alpha=1/(|I_{Correction}-\mathrm{Med}(I)|+\beta)^k \quad \text{Formula 6}$$

In step S512, the processor may correct the vector. In step S513 and step S514, the processor may end the process of recalculating the compensation coefficient. In other words, the image signal adjustment method of the disclosure may calculate the gray-scale value of the subpixel to be adjusted according to the degree of change of the subpixels in at least one direction passing through the subpixel to be adjusted. For example, when the difference between the gray-scale values of the subpixels in the first direction and the second direction is smaller than the threshold value, the processor may use the gray-scale values of the subpixels in the first direction and the gray-scale values of the subpixels in the second direction, the weight value corresponding to the first direction and the weight value corresponding to the second direction to calculate the gray-scale value of the subpixel to be adjusted. When the degree of change of the gray-scale values of multiple subpixels in the first direction, the second direction, the third direction, and the fourth direction are similar (for example, passing through the first direction, the second direction, the third direction, and the fourth direction, the difference between the gray-scale values of the multiple sub-pixels in the respective directions are all smaller than the threshold value), the processor may use the gray-scale values of the multiple subpixels in the first direction, the gray-scale values of the multiple subpixels in the second direction, the gray-scale values of the multiple subpixels in the third direction, the gray-scale values of the multiple subpixels in the fourth direction, the weight value corresponding to the first direction, the weight value corresponding to the second direction, the weight value corresponding to the third direction, and the weight value corresponding to the fourth direction to calculate the gray-scale value of the subpixel to be adjusted.

Referring to FIG. 2B, the processor may recalculate the compensation coefficient (step S217) and then execute step S218 to calculate the correction value. In this embodiment, the correction value may be calculated according to the following Formula 7. In Formula 7, i is the ordinal number of different vectors, and may be set as a positive integer. For example, the i value of vector 33V is taken as 1, and the i value of vector 34V is taken as 2. In this embodiment, the processor may calculate the gray-scale value of the subpixel to be adjusted by averaging the gray-scale values of multiple adjacent subpixels of the subpixel to be adjusted. Specifically, in this embodiment, since the vector with the highest priority is only the vector 33V, the correction value in this embodiment is the compensation value of the vector 33V, and according to Formula 3 above, the processor may calculate the compensation value of the vector 33V as 227, which is the average of 226 and 228. Therefore, the processor may obtain the correction value of the subpixel to be adjusted as 227.

$$I_{new}=\Sigma_i\frac{\alpha_i}{\Sigma_i\ \alpha_i}\times I_{Correction,i} \quad \text{Formula 7}$$

It is worth noting that when there is only one vector with the highest priority, the direction of the vector is the first direction, and the image signal adjustment method of the disclosure only requires the processor to analyze the gray-scale values of multiple subpixel in the first direction (step S120), and calculate and obtain the gray-scale value of the subpixel to be adjusted according to the gray-scale values of the subpixels in the first direction (step S130). In this way, the image signal adjustment method of the disclosure may have the function of adjusting and compensating the image signal with low computing power and/or better efficiency according to the subpixel distribution of different image signals.

To sum up, the image signal adjustment method of the detection device of the disclosure may compensate the defect points on the image signal according to the subpixel information around the defect point in the image signal, and improve the effect of compensating the image signal by determining the degree of change of the grayscale value of the surrounding sub-pixels, which may also be implemented in computing devices with low computing power. In this way, the efficiency and/or compatibility of the image signal adjustment method of the detection device of the disclosure may be improved, and a stable and/or better image signal compensation/adjustment function may be provided.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. An image signal adjustment method of a detection device, the detection device outputting an image signal comprising a plurality of subpixels, wherein the image signal adjustment method comprises:

locating a subpixel to be adjusted;

analyzing gray-scale values of subpixels in a first direction passing through the subpixel to be adjusted; and using the gray-scale values of the subpixels in the first direction to calculate a gray-scale value of the subpixel to be adjusted;

analyzing gray-scale values of a plurality of subpixels in a second direction passing through the subpixel to be adjusted;

calculating a first weight value and a second weight value respectively corresponding to the first direction and the second direction; and using the gray-scale values of the subpixels in the first direction, the gray-scale values of the subpixels in the second direction, the first weight value, and the second weight value to calculate the gray-scale value of the subpixel to be adjusted.

2. The image signal adjustment method according to claim 1, wherein the image signal adjustment method further comprises:

calculating a change of gray-scale value near the subpixel to be adjusted to obtain the subpixels whose difference of gray-scale value between adjacent subpixels of the subpixels on a same line is less than a threshold value; and using a direction in which the difference of the gray-scale values between the adjacent subpixels of the subpixels on the same line as the subpixel to be adjusted is smaller than the threshold value as the first direction.

3. The image signal adjustment method according to claim 1, wherein the image signal adjustment method further comprises:

taking an average value of gray-scale values of a left subpixel and a right subpixel as the gray-scale value of the subpixel to be adjusted.

4. The image signal adjustment method according to claim 1, wherein the image signal adjustment method uses an interpolation method onto the gray-scale values of the subpixels in the first direction to calculate the gray-scale value of the subpixel to be adjusted.

5. The image signal adjustment method according to claim 1, further comprising:

comparing a threshold value with the gray-scale values of the subpixels in the first direction and the threshold value with the gray-scale values of the subpixels in the second direction to determine the first weight value and the second weight value.

6. The image signal adjustment method according to claim 5, further comprising:

using an interpolation method onto the gray-scale values of the subpixels in the first direction and the gray-scale values of the subpixels in the second direction to calculate the first weight value of the first direction and the second weight value of the second direction.

7. The image signal adjustment method according to claim 5, wherein the threshold value is determined by the gray-scale values of the subpixels around the subpixel to be adjusted.

8. The image signal adjustment method according to claim 5, wherein the threshold value is determined by an absolute value of a difference between adjacent two subpixels of at least one bilaterally usable vector and/or a difference between a same-side first subpixel and a same-side second subpixel of at least one unilaterally usable vector.

9. The image signal adjustment method according to claim 8, wherein a difference sum is calculated by adding the absolute value of the difference between the adjacent two subpixels of the at least one bilaterally usable vector and/or the difference between the same-side first subpixel and the same-side second subpixel of the at least one unilaterally usable vector, and the threshold value is determined by a difference that is closest to a percentage value of the difference sum.

10. The image signal adjustment method according to claim 9, wherein the percentage value is 20%.

11. The image signal adjustment method according to claim 8, further comprising:

using whether two subpixels adjacent on both sides in the first direction or the second direction are usable subpixels to determine a vector is a bilaterally usable vector, a unilaterally usable vector, or an unusable vector.

12. The image signal adjustment method according to claim 11, further comprising:

using the two subpixels adjacent on both sides in the first direction or the second direction are both unusable subpixels to determine the corresponding first direction or the corresponding second direction is the unusable vector.

13. The image signal adjustment method according to claim 11, further comprising:

using the two subpixels adjacent on both sides in the first direction or the second direction are both usable subpixels to determine the corresponding first direction or the corresponding second direction is a bilaterally usable vector in the at least one bilaterally usable vector.

14. The image signal adjustment method according to claim 11, further comprising:

using the two subpixels adjacent on both sides in the first direction or the second direction comprises usable subpixel on only one side to determine the corresponding first direction or the corresponding second direction is a unilaterally usable vector in the at least one unilaterally usable vector.

15. The image signal adjustment method according to claim 5, wherein the threshold value is a preset value.

16. The image signal adjustment method according to claim 5, determining the first weight value and the second weight value by a degree of change of the gray-scale values of the subpixels in the first direction and the second direction.

17. The image signal adjustment method according to claim 1, wherein the gray-scale value of the subpixel to be adjusted is calculated by taking an average value of gray-scale values of a plurality of adjacent subpixels of the subpixel to be adjusted.

18. The image signal adjustment method according to claim 1, further comprising:

analyzing gray-scale values of a plurality of subpixels in a third direction passing through the subpixel to be adjusted;

analyzing gray-scale values of a plurality of subpixels in a fourth direction passing through the subpixel to be adjusted;

calculating a third weight value and a fourth weight value respectively corresponding to the third direction and the fourth direction; and using the gray-scale values of the subpixels in the first direction, the gray-scale values of the subpixels in the second direction, the gray-scale values of the subpixels in the third direction, the gray-scale values of the subpixels in the fourth direction, the first weight value, the second weight value, the third weight value, and the fourth weight value to calculate the gray-scale value of the subpixel to be adjusted.

19. The image signal adjustment method according to claim 18, further comprising:

comparing a threshold value with the gray-scale values of the subpixels in the first direction, the threshold value with the gray-scale values of the subpixels in the second direction, the threshold value with the gray-scale values of the subpixels in the third direction, and the threshold value with the gray-scale values of the subpixels in the fourth direction to determine the first weight value, the second weight value, the third weight value, and the fourth weight value.

* * * * *